US012759519B2

(12) United States Patent
Schumann et al.

(10) Patent No.: US 12,759,519 B2
(45) Date of Patent: Oct. 13, 2026

(54) VEHICLE WHEEL STEER CONTROL SYSTEM AND METHOD

(71) Applicants: Steering Solutions IP Holding Corporation, Auburn Hills, MI (US); Continental Automotive Systems, Inc., Auburn Hills, MI (US)

(72) Inventors: Clinton L. Schumann, Holly, MI (US); Scott T. Sanford, Swartz Creek, MI (US)

(73) Assignees: Steering Solutions IP Holding Corporation, Aubrun Hills, MI (US); Continental Automotive Systems Inc., Auburn Hills, MI (US)

( * ) Notice: Subject to any disclaimer, the term of this patent is extended or adjusted under 35 U.S.C. 154(b) by 0 days.

(21) Appl. No.: 18/674,238

(22) Filed: May 24, 2024

(65) Prior Publication Data

US 2024/0308485 A1 Sep. 19, 2024

Related U.S. Application Data

(63) Continuation of application No. 17/012,277, filed on Sep. 4, 2020, now Pat. No. 12,017,629.

(Continued)

(51) Int. Cl.

| | |
|---|---|
| ***B60T 8/172*** | (2006.01) |
| ***B60T 8/1755*** | (2006.01) |
| ***B60T 8/24*** | (2006.01) |
| ***B62D 7/22*** | (2006.01) |
| ***B62D 15/02*** | (2006.01) |

(52) U.S. Cl.

CPC .............. *B60T 8/246* (2013.01); *B60T 8/172* (2013.01); *B60T 8/1755* (2013.01); *B62D 7/228* (2013.01); *B62D 15/021* (2013.01); *B60T 2201/16* (2013.01)

(58) Field of Classification Search

None

See application file for complete search history.

(56) References Cited

U.S. PATENT DOCUMENTS

| | | | | |
|---|---|---|---|---|
| 9,026,311 | B1 * | 5/2015 | Pieronek ............... | B60T 8/1708 280/455.1 |
| 10,046,743 | B2 | 8/2018 | Jonasson et al. | |

(Continued)

FOREIGN PATENT DOCUMENTS

| | | |
|---|---|---|
| CN | 101484347 A | 7/2009 |
| CN | 103118922 A | 5/2013 |

(Continued)

OTHER PUBLICATIONS

CN Office action dated Nov. 29, 2023 for CN application No. 202010989156.2.

(Continued)

*Primary Examiner* — Angela Y Ortiz
*Assistant Examiner* — Laura E Linhardt
(74) *Attorney, Agent, or Firm* — Ingrassia Fisher & Lorenz, LLP

(57) ABSTRACT

Steering a vehicle may include applying a net brake-steering force to a steered wheel sufficient to affect a steering moment upon the steered wheel sufficient to move the steered wheel away from a zero steering angle, and resisting movement of the steered wheel back toward the zero steering angle.

14 Claims, 3 Drawing Sheets

Related U.S. Application Data

(60) Provisional application No. 62/902,684, filed on Sep. 19, 2019.

(56) References Cited

U.S. PATENT DOCUMENTS

| | | | | |
|---|---|---|---|---|
| 2005/0236894 | A1 | 10/2005 | Lu et al. | |
| 2006/0113940 | A1 * | 6/2006 | Nagai | H02K 7/06 318/434 |
| 2011/0045932 | A1 * | 2/2011 | Fauteux | B25J 9/102 475/221 |
| 2011/0049970 | A1 * | 3/2011 | Hironaka | B60T 8/4081 303/6.01 |
| 2016/0325721 | A1 * | 11/2016 | Jonasson | B60T 8/171 |
| 2018/0208184 | A1 * | 7/2018 | Sugai | B60L 15/2009 |
| 2020/0062229 | A1 * | 2/2020 | Amamoto | B60T 8/76 |
| 2020/0384967 | A1 * | 12/2020 | Hiraga | B60T 8/245 |

FOREIGN PATENT DOCUMENTS

| | | | |
|---|---|---|---|
| CN | 106125722 | A | 11/2016 |
| DE | 102006028957 | A1 | 12/2007 |
| DE | 102018106889 | A1 | 9/2019 |
| DE | 102019104392 | A1 | 8/2020 |
| EP | 1369338 | A1 | 12/2003 |
| EP | 3090907 | A1 | 11/2016 |

OTHER PUBLICATIONS

DE Office action dated Oct. 31, 2023 for DE application No. 102020124354.5.

* cited by examiner

VEHICLE WHEEL STEER CONTROL SYSTEM AND METHOD

CROSS-REFERENCE TO RELATED APPLICATIONS

This application claims the benefit of U.S. Provisional Application Ser. No. 62/902,684 filed Sep. 19, 2019, and U.S. Non-Provisional application Ser. No. 17/012,277 filed Sep. 4, 2020.

TECHNICAL FIELD

This disclosure is related to vehicle braking and steering systems.

BACKGROUND

The statements in this section merely provide background information related to the present disclosure. Accordingly, such statements are not intended to constitute an admission of prior art.

Vehicles typically include steering and braking systems. Steering and braking systems, among others, affect vehicle motion control.

SUMMARY

Steering a vehicle includes applying a net brake-steering force to a steered wheel sufficient to affect a steering moment upon the steered wheel sufficient to move the steered wheel away from a zero steering angle and resisting movement of the steered wheel back toward the zero steering angle.

BRIEF DESCRIPTION OF THE DRAWINGS

One or more embodiments will now be described, by way of example, with reference to the accompanying drawings, in which.

DETAILED DESCRIPTION

Figure 1:
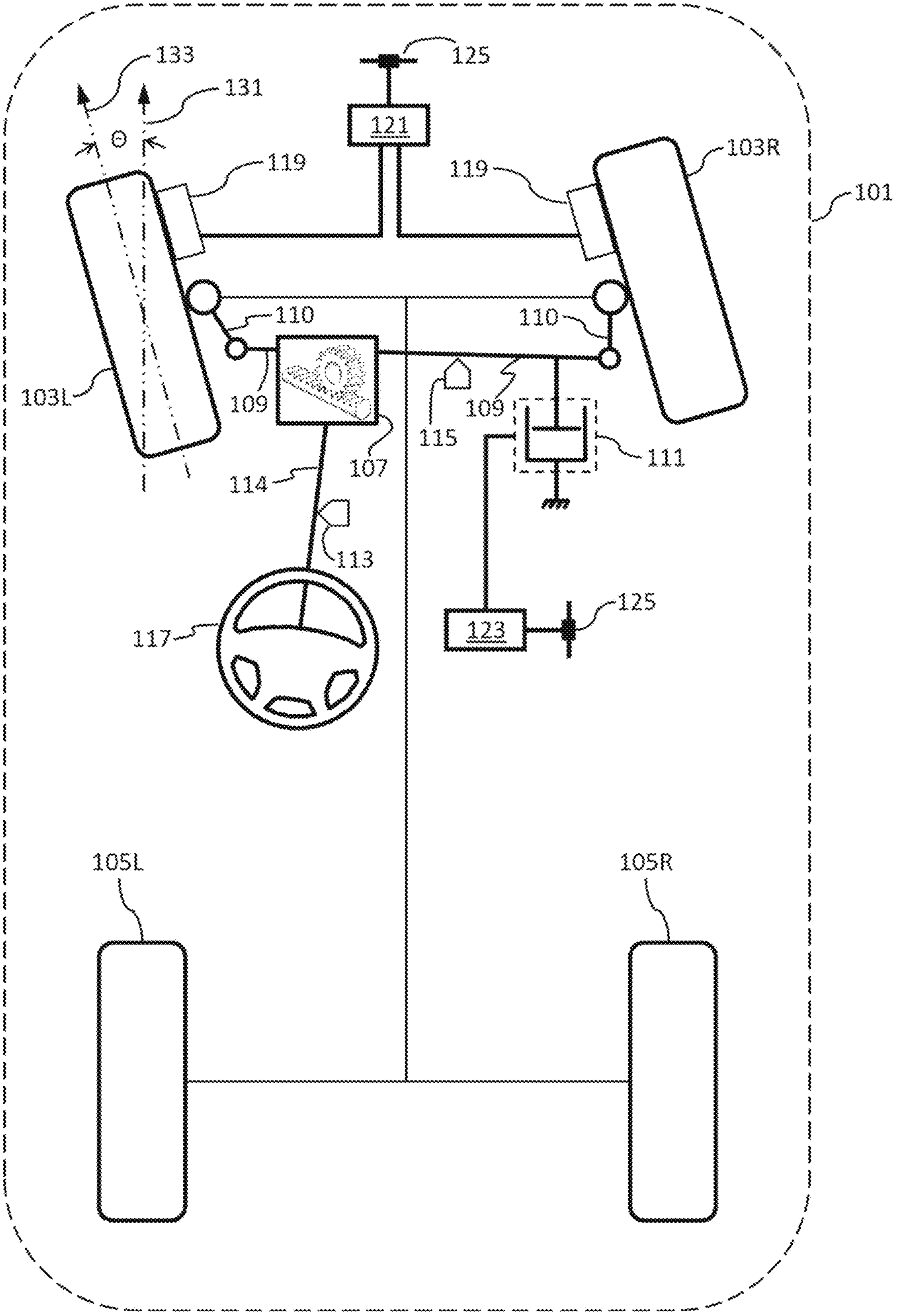
FIG. 1 illustrates a vehicle according to a number of illustrative variations.

Referring now to the drawings, wherein the showings are for the purpose of illustrating certain variations only and not for the purpose of limiting the same, FIG. 1 schematically illustrates a vehicle 101 including a front side-to-side pairing of wheels and a rear side-to-side pairing of wheels. Though some or all of the wheels may be mounted on independent spindles or axles, each such pairing of wheels may be referred to as an axle set. The front axle set includes left and right front wheels 103L, 103R respectively, and the rear axle set includes left and right rear wheels 105L, 105R respectively. Other multi-wheeled vehicles within the scope of the claimed subject matter may include combinations more or fewer wheels and additional axle sets. The vehicle is propelled by a powertrain system (not illustrated) which applies drive torque to at least one of the wheels. Vehicle braking may be affected by a braking system preferably including an individually controllable friction brake at each wheel. Such braking systems may include multi-channel hydraulic circuits each of which may be individually actuated to control hydraulic brake pressure and hence brake apply to the respective wheel independent of the other wheels. Other braking system are known including electric machine torque application such as in motor at wheel electric drives. At least one such brake may be associated with at least one of the steered wheels. In FIG. 1, independently actuatable brakes 119 are shown associated with each front wheel 103L, 103R. Brake control module (BCM) 121 may provide the braking functions including hydraulic brake pressure application, control and diagnostic functions. BCM 121 may participate in a controller area network (CAN) as illustrated via bus 125 of such a CAN including sending and receiving data, requests and commands among other networked control modules.

Directional steering in vehicle 101 is provided by the front wheels which are steered wheels with the rear wheels 105L, 105R merely trailing. Alternatively, wheels other than the front wheels may also be steered and such arrangements also fall within the scope of the claimed subject matter. The steering system in the vehicle 101 may include a rack and pinion gear set 107. The rack gear may be coupled at opposite ends to steering linkage such as tie rods 109 and steering arms 110, for example, to transfer the linear motion of the rack to change the steering angle of the steered wheels 103L, 103R. A pinion gear at one end of a steering shaft 114 may mesh with the rack gear such that rotary motion of a steering wheel 117 at the opposite end of the steering shaft 114 translates the rack gear to change the steering angle of the steered wheels 130L, 103R. Alternative steering mechanisms may be employed including steering gearboxes and appropriate linkages. Additionally, steering systems may employ electric or hydraulic assist. And, "by-wire" steering systems are known which mechanically decouple the steering wheel or alternate operator interface from the steering mechanism. All such alternative steering systems' features and combinations fall within the scope of the claimed subject matter. One or more steering angle position sensors 113, 115 may be employed for detecting and deriving feedback and control parameters such as rotation displacement, rotation direction, rotational velocity and acceleration, desired steering angle, actual steering angle, etc. For example, sensor 113 is shown on one side of the rack and pinion set 107 to sense rotary displacement of the coupled steering shaft 114 and steering wheel 115, whereas sensor 115 is shown on the opposite side of the rack and pinion set 107 to sense linear displacement of the coupled rack and tie rods 109. When the steering wheel 117 or alternative operator interface is mechanically coupled to the steering linkages then sensor 113 may be sufficient for detecting and deriving feedback and control parameters. However, when there is no such direct mechanical connection, sensor 115 may be required for detecting and deriving steering system parameters such as actual steering angle. Sensors may couple directly to control modules or may interface with the CAN via a node. Lateral control module (LCM) 123 may provide vehicle stability control functions based upon steering angle, yaw, wheel speed etc. such as but not limited to developing wheel braking and powertrain torque commands to be carried out by the BCM and a powertrain control module (PCM), and Steering control unit (SCU) functions including, for example, by-wire steering control responsive to operator input and to carry out autonomous and semi-autonomous functions such as but not limited to lane keeping and vehicle platooning. The LCM 123 may house logic for steering the vehicle laterally via any available means in a situation wherein braking to steer may be necessary. The LCM 123 may be used along with or communicate with any modules to perform any number of the functions of the LCM 123 as necessary, which may include but are not limited to the functions of Electronic Stability Control (ESC) modules, the functions of SCU modules, the functions of BCMs, the functions of PCMs, the functions Traction Control Systems (TCS), or the functions of any other known vehicle system or module that may provide any form of control regarding vehicle movement such as but not limited to control of vehicle yaw control, vehicle roadwheel speed, anti-lock brake function, emergency brake, traction control. Certain driving situations may arise in which LCM 123 may need to communicate with numerous modules controlling both lateral and longitudinal movement in order for the LCM 123 to perform an LCM 123 function. For example, a situation may arise in which any number of steering components or modules have fully or partially failed in highway traffic, and the vehicle's longitudinal travel needs to be controlled for safety reasons while the vehicle systems or sensors scan for an opportunity for the vehicle to hobble to the side of the road by braking to steer according to at least one of the methods described herein. Moreover, upon a detected steering failure—and to prevent the driver from causing a crash—throttling may disabled by the LCM 123 via the PCM and a slight straightforward brake may be applied by the LCM 123 via the BCM while the LCM 123 may communicate with sensors on the right side of the vehicle to find an opening in traffic into which the vehicle may be steered via braking by the LCM 123, according to at least one of the methods described herein, until the vehicle is safely stopped on the right shoulder of the road. It is also contemplated that a similar situation may arise in which acceleration instead of braking is desirable. In such a case, the LCM 123 may similarly work with other vehicle modules or systems to produce the desired acceleration. In accordance with this disclosure, LCM functions may include developing wheel braking commands and damping steering movement of steered wheels to affect steering based upon the brake force, wheel to road dynamics, chassis design, and vehicle speed, among other factors. Damper 111 is shown mechanically operatively coupled to the steering linkage and controllably operatively coupled to LCM 123. Damper 111 may take any suitable form effective to impede or, attenuate or lock motion of the steering motion of a steered wheel. For example, damper 111 may be a hydraulic damper with a controllable orifice. Damper 111 may be incorporated within a hydraulic assist circuit as a variable orifice. Damper 111 may be implemented as a friction device such as a band clutch, brake, wet or dry slipping clutch, etc. Damper 111 may be a selectively engaged Sprague clutch, overrun clutch, ratchet or similar. Damper 111 may be a variable resistance magnetic screw. Damper 111 may be a magneto-rheological fluid damper. LCM 123 may participate in the controller area network (CAN) as illustrated via bus 125 including sending and receiving data, requests and commands among other networked control modules.

Control module means any one or various combinations of one or more of Application Specific Integrated Circuit(s) (ASIC), electronic circuit(s), central processing unit(s) and associated memory and storage (read only, programmable read only, random access, hard drive, etc.) that may execute one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module may have a set of control routines executed to provide the desired functions. Routines may be executed, such as by a central processing unit, and may be operable to monitor inputs from sensing devices and other networked control modules and may execute control and diagnostic routines to control operation of actuators. Routines may be executed at regular intervals during ongoing engine and vehicle operation. Alternatively, routines may be executed in response to occurrence of an event or upon operator input.

Figure 2:
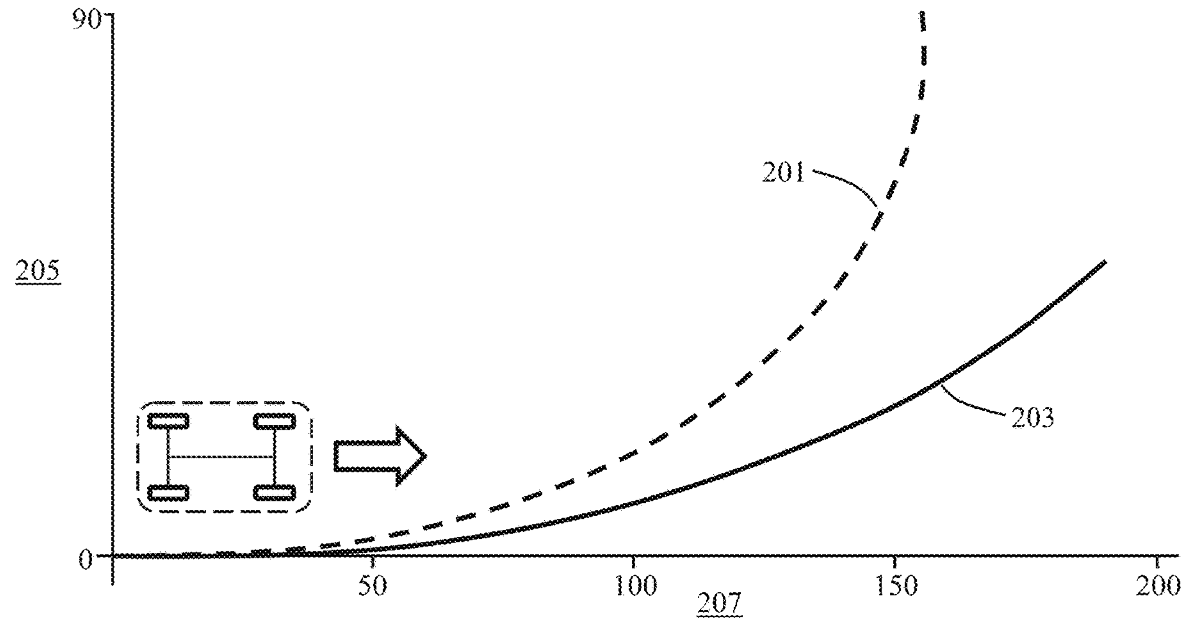
FIG. 2 illustrates various lateral vehicle displacements according to a number of illustrative variations.
Figure 3:
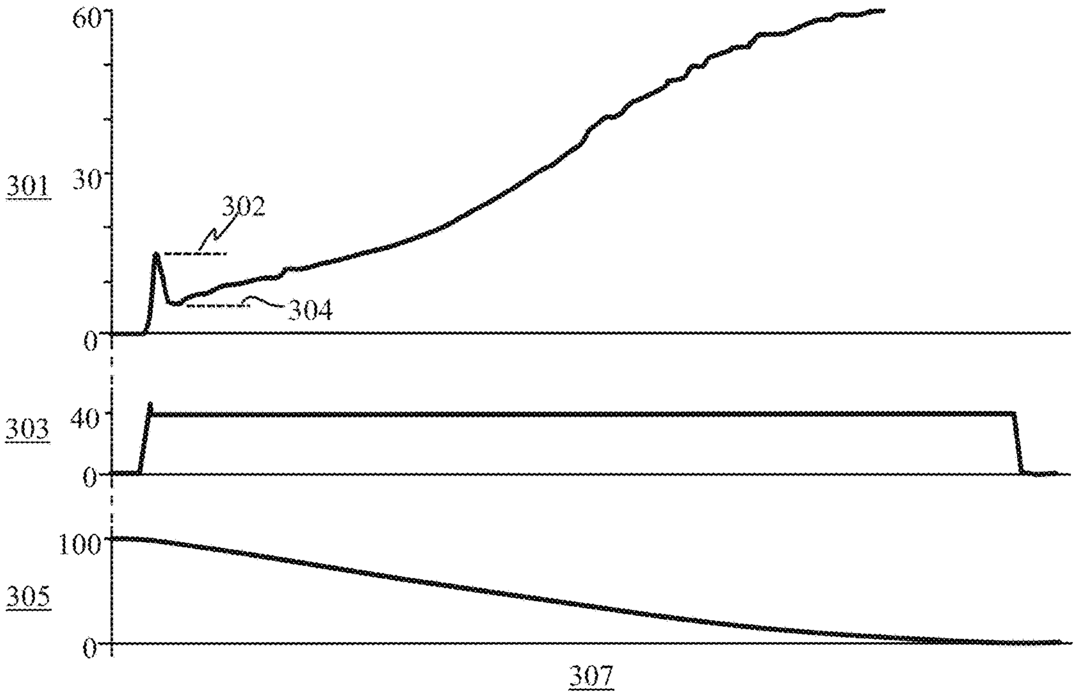
FIG. 3 illustrates steering angle, brake pressure and vehicle speed corresponding to FIG. 2, and according to a number of illustrative variations.

FIG. 2 illustrates the efficacy of the vehicle wheel steer control system and method in accordance with the disclosure wherein braking is applied to a left front wheel of a vehicle. FIG. 2 graphically shows on the horizontal axis 207 longitudinal vehicle displacement in meters and on the vertical axis 205 lateral vehicle displacement in meters with the intersection being the origin of the graph. FIG. 3 graphically shows on the horizontal axis 307 longitudinal vehicle displacement in meters corresponding to the same displacements along the horizontal axis 207 of FIG. 2. Vertical axis 305 represents vehicle speed in kph, vertical axis 303 represents hydraulic brake pressure in bar, and vertical axis 301 represents steered wheel angle in degrees. As used herein, steered wheel angle, steering angle and steering wheel angle are equivalent terms. With reference to FIG. 1, steering angle Θ represents the angle that the centerline of the wheel 133 makes with the vehicle longitudinal axis 131. Steering angles that open to the left in the figure are designated positive (+) and steering angles opening to the right in the figure are designated negative (−). Again, with reference to FIG. 2, at the origin, each curve 201, 203 represents initial vehicle speed of substantially 100 kph and a steering angle Θ of substantially zero. Curve 203 represents a baseline displacement response of the vehicle during application of the left front wheel brake wherein the steering angle Θ is maintained at substantially zero degrees. Such vehicle redirection may be referred to a brake steer and is the result of differences in braking between wheels on opposite sides of the vehicle or differences in braking among the four corners of the vehicle. Unchecked, such brake steer may be undesirable; however, such principles are controllably employed in advanced vehicle stability controls and in brake steering systems employed primarily in heavy equipment applications for improved low speed cornering performance. Curve 201 represents a displacement response of the vehicle during application of the left front wheel brake wherein the steering angle Θ is permitted to increase from zero unchecked. Brake application at the steered wheel results in a steering moment upon the steered wheel related to the brake force, wheel to road dynamics, chassis design, and vehicle speed, among other factors. In particular, brake force at a steered wheel will impart a moment upon the steered wheel whose direction and magnitude are related to the scrub radius, scrub direction, and brake force. In this illustrative variation, positive scrub radius will result in a moment upon the steered wheel to open the steering angle away from the vehicle centerline whereas a negative scrub radius will result in a moment upon the steered wheel to open the steering angle toward the vehicle centerline. In this illustrative variation, the vehicle includes a positive scrub radius of substantially +50 mm with a resultant increasing steering angle to the outside of the vehicle. Since the steered wheel in in this illustrative variation is the left front, the vehicle is steered left. If instead the right front steered wheel is braked and has a positive scrub radius, then the resultant increasing steering angle is also to the outside of the vehicle and the vehicle may be steered right. Negative scrub radius at the steered wheels may result in increasing steering angle to the inside of the vehicle. In such configuration, if the steered wheel is the left front, the vehicle may be steered right. And, if the steered wheel is the right front, the vehicle may be steered left. The lateral displacement differences between curves 203 and 201 are due to the progression of the steering angle affected by the continuous brake force application at the left front wheel.

With reference to FIG. 3, and more particularly to the top chart showing steered wheel angle along vertical axis 301, applicants have observed the steered wheel angle may reach an early local maximum 302 followed by a reduction to a local minimum 304 in steering angle and subsequent increase in steering angle all in accordance with a steady state brake pressure (i.e. 40 bar). This initial steering angle retreat may be a result of alignment torques from, for example, tire pneumatics, contact patch deformations, caster effects and steering axis inclination effects among others. Such response characteristics may be tolerable where steering control in accordance with the disclosure is less aggressive; however, such response may become increasingly objectionable in more aggressive steering control is desired and the dynamic range of such anomaly may increase. Therefore, damper 111 may be employed to prevent reverse motion of the steered wheel when the desired steering angle is attained or when continued procession of the steering angle is desired.

Figure 4:
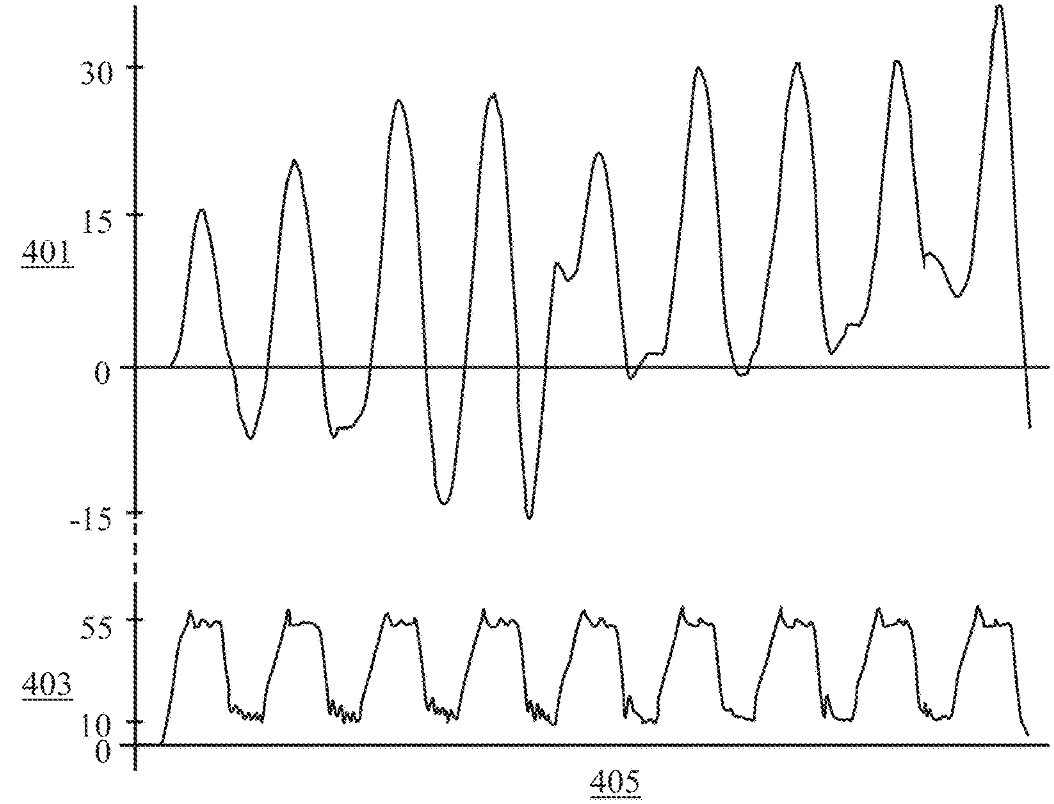
FIG. 4 illustrates steering angle response and corresponding brake application pressure according to a number of illustrative variations.

Applicants recognize that modulating or pulsing brake pressure may be desirable for a number of reasons including, for example, reducing energy consumption and control granularity. With reference to FIG. 4, the alignment torque effects are displayed as more acute at least in certain operating realms. Vertical axis 401 represents steering angle in degrees and vertical axis 403 represents brake pressure in bar, both against the horizontal axis of vehicle displacement or time. Whereas continuous brake pressure application as shown in FIG. 3 may tend to attenuate the early retreat of steering angle, the pulsed brake pressure shown in FIG. 4 may provide unchecked retreat of the steering angle when brake pressure is released and in fact may allow steering angle reversals, oscillations, and large dynamic range within such behaviors. The steering angles in FIG. 4 may vary between about 30 degrees and −15 degrees. The brake pressure in FIG. 4 may vary between about 55 bar and 10 bar.

Figure 5:
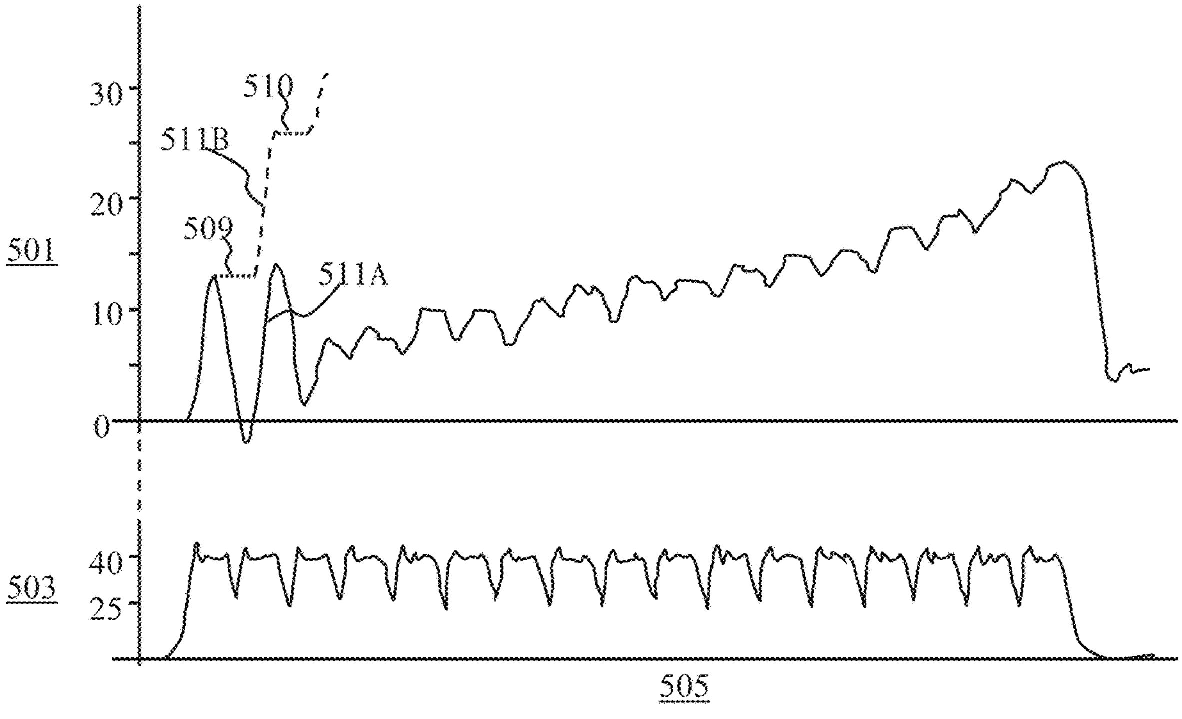
FIG. 5 illustrates steering angle controls and corresponding brake application pressure according to a number of illustrative variations.

Applicants recognize that reducing dynamic range or peak-to-peak variation in pulsed brake pressure and the absolute minimum brake pressure may greatly reduce oscillation tendency in the resultant steering angle response, eliminate steering angle reversals, and smooth the trend in increasing the steering angle. Referring to FIG. 5, vertical axis 501 represents steering angle in degrees and vertical axis 503 represents brake pressure in bar, both against the horizontal axis of vehicle displacement or time. The brake pressure pulses illustrated in FIG. 5 may exhibit a dynamic range of only about one-third of that of the brake pressure pulses illustrated in FIG. 4. Moreover, the steady state maximum pressure pulse may also be less at substantially 40 bar and the steady state minimum pressure pulse may also be greater at substantially 25 bar. Applicants believe the higher minimum pressure pulses are often effective to check large steered wheel movements back toward zero steering angle. From FIG. 5, the steering angle oscillations are seen to be substantially attenuated and a clear trending of increasing steering angles is apparent. Combining the feature of damping steering movement of the steered wheel back toward the zero steering angle with pulse pressure control of the brake at the steered wheel also is illustrated in FIG. 5. Damping or resisting such movement may allow the steering angle to be effectively held in place when the alignment torque is greater than the wheel steering torque resulting from the brake apply such as when brake pressure is reduced. For example, steering angle first reaches a local peak 509 where after, if unchecked, the steering angle may retreat. However, this steering angle reversal is prevented with applied damping and the steering angle remains at the level 509 until the wheel steering torque resulting from the brake application once again exceeds the alignment torque. At this point the incremental change in steering angle may begin from the held steering angle 509 following trajectory 511B substantially corresponding to the corresponding steering angle trajectory 511A where the steering angle was allowed to retreat. Steering angle reversal may again be prevented with applied damping such that the steering angle may remain at the level 510 until the wheel steering torque resulting from the brake apply once again exceeds the alignment torque. Such incremental movements of the steered wheel and steering angle may be repeated as required until a desired steering angle is ultimately attained.

Applicants recognize that each steered wheel of an axle set of steered wheels may, when braked, exhibit wheel steering torque opposite the other. Thus, simultaneous brake apply at such an axle pair of steered wheels may result in a net brake-steer force of substantially zero. However, it may be desirable during a vehicle wheel steer event as has been set forth in this disclosure that total vehicle braking be more substantial than achievable by leaving one of a pair of steered wheels unbraked. Therefore, a differential braking scheme may be employed wherein the wheel that is desirable steered by wheel steering torque experiences a greater brake pressure than the other steered wheel and a net brake-steering force operates upon the desirably steered wheel and total vehicle braking is enhanced by more complete brake system utilization.

In a number of illustrative variations, the method and system for steering a vehicle using braking provides an improved redundancy of the vehicle's steering system. Should the primary steering system fail or become compromised, the redundant steering system using braking can be implemented to finish steering the vehicle to its destination of to simply steer the vehicle to the side of the road. The method and system for steering a vehicle using braking may be advantageous in autonomous driving vehicles. The improved redundancy for steering by braking eliminates the need for a secondary steering system substantially similar to the primary steering system, for example, using a motor to drive the steering shaft or rack and pinion system or other system. Alternatively, the steering by braking may be implemented as a tertiary steering system.

The disclosure has described certain illustrative variations and modifications thereto. Further modifications and alterations may occur to others upon reading and understanding the specification. Therefore, it is intended that the disclosure not be limited to the particular illustrative variations disclosed as the best mode contemplated for carrying out this disclosure, but that the disclosure will include all illustrative variations falling within the scope of the appended claims.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a method comprising:

applying a net brake-steering force to a steered wheel sufficient to affect a steering moment upon the steered wheel sufficient to move the steered wheel away from a zero steering angle; and, resisting movement of the steered wheel back toward the zero steering angle.

Variation 2 may include the method of variation 1, wherein resisting movement of the steered wheel back toward the zero steering angle is affected when the net brake-steering force is insufficient to continue moving the steered wheel away from the zero steering angle.

Variation 3 may include the method of any of variations 1 or 2, wherein applying a net brake-steering force to a steered wheel sufficient to affect a steering moment upon the steered wheel sufficient to move the steered wheel away from a zero steering angle is periodically performed.

Variation 4 may include the method of variation 1, wherein resisting movement of the steered wheel back toward the zero steering angle is affected when the net brake-steering force is insufficient to continue moving the steered wheel away from the zero steering angle Variation 5 may include the method of any of variations 1-4 wherein the net brake-steering force to a steered wheel is accomplished by braking one of a pair of steered wheels.

Variation 6 may include the method of any of variations 1-4, wherein the net brake-steering force to a steered wheel is accomplished by differential braking a pair of steered wheels.

Variation 7 may include a system comprising: a steered wheel; a braking system for applying a net brake-steering force to the steered wheel; and, a damper operatively coupled to the steered wheel for damping steering of the steered wheel toward a zero steering angle.

Variation 8 may include a system comprising: a steered wheel; a steering angle sensor to detect the steering angle of the steered wheel; a braking system for braking the steered wheel; a damping system for damping steering movement of the steered wheel; and, a control system, comprising a processor and memory, operably coupled to the braking system and damping system to periodically brake the steered wheel sufficient to affect a steering moment upon the steered wheel sufficient to incrementally move the steered wheel toward a desired steering angle and damp steering movement of the steered wheel subsequent to the incremental movement of the steered wheel sufficient to damp steering movement of the steered wheel away from the desired steering angle.

Variation 9 may include the system of variation 8 further comprising a user interface for receiving input from a user indicating the desired steering angle for the steered wheel.

Variation 10 may include the system of any of variations 8 or 9 wherein the steered wheel comprises a positive scrub radius.

Variations 11 may include the system of any of variations 8 or 9 wherein the steered wheel comprises a negative scrub radius.

Variation 12 may include the system of any of variations 8-9 and 10-11 wherein the steered wheel comprises a front wheel of the vehicle.

Variation 13 may include the system of any of variations 8-9 and 10-11 wherein the steered wheel comprises a rear wheel of the vehicle.

What is claimed is:

1. A system comprising:

a vehicle comprising a steered wheel;

a steering angle sensor to detect a steering angle of the steered wheel, wherein a steering angle represents the angle that a centerline of the steered wheel makes with a longitudinal axis of the vehicle, wherein steering angles that open to in a left direction of the centerline is a positive steering angle and steering angles opening to the right direction of the centerline is a negative steering angle;

a braking system for braking the steered wheel to steer a vehicle, wherein the braking system comprises a controllable friction brake connected to the steered wheel;

a damping system for damping steering movement of the steered wheel; and a control system, comprising a processor and memory, operably coupled to the braking system and damping system to periodically brake the steered wheel comprising pulsed brake pressure control of a brake at the steered wheel sufficient to affect a steering moment upon the steered wheel sufficient to incrementally move the steered wheel toward a desired steering angle that is one of the positive steering angle or the negative steering angle, and to prevent reverse motion of the steered wheel when the desired steering angle is attained, wherein the pulsed brake control produced at least four brake pulses.

2. The system of claim 1 further comprising a user interface for receiving input from a user indicating the desired steering angle for the steered wheel, and wherein one of the four brake pulses is greater than at least one of the other brake pulses of the four brake pulses.

3. The system of claim 1 wherein the steered wheel comprises a positive scrub radius.

4. The system of claim 1 wherein the steered wheel comprises a negative scrub radius.

5. The system of claim 1 wherein the steered wheel comprises a front wheel of the vehicle, and wherein the control system generates a brake command based on a chassis design of the vehicle.

6. The system of claim 1 wherein the steered wheel comprises a rear wheel of the vehicle.

7. The system of claim 1 further comprising a damper connected to a steering linkage comprising tie rods and steering arms of the vehicle.

8. The system as set forth in claim 7 wherein the damper is a hydraulic damper.

9. The system as set forth in claim 7 wherein the damper is a variable resistance magnetic screw.

10. The system as set forth in claim 7 wherein the damper is a magnetorheological fluid damper.

11. A system comprising:

a steered wheel;

a steering angle sensor to detect a steering angle of the steered wheel;

a braking system for braking the steered wheel;

damping system for damping steering movement of the steered wheel; and a control system, comprising a processor and memory, operably coupled to the braking system and damping system to periodically brake the steered wheel comprising pulsed brake pressure control of a brake at the steered wheel sufficient to affect a steering moment upon the steered wheel sufficient to incrementally move the steered wheel toward a desired steering angle and to prevent reverse motion of the steered wheel when a desired steering angle is attained, wherein the pulse brake pressure control of the brake comprises an oscillating brake pressure comprising a plurality of oscillations from a first brake pressure to a second brake pressure without the brake pressure going to zero brake pressure, wherein the second brake pressure is greater than the first brake pressure.

12. The system as set forth in claim 11 wherein the control system generates a brake command based on a chassis design of the vehicle.

13. The system as set forth in claim 11 wherein the control system generates a brake command based a vehicle speed.

14. The system as set forth in claim 11 wherein the control system generates a brake command based a brake force.

* * * * *